Feb. 18, 1936.  H. J. STREYCKMANS  2,031,079
DEVICE FOR THE REWINDING OF PHOTOGRAPHIC FILMS
Filed March 6, 1933  2 Sheets-Sheet 2

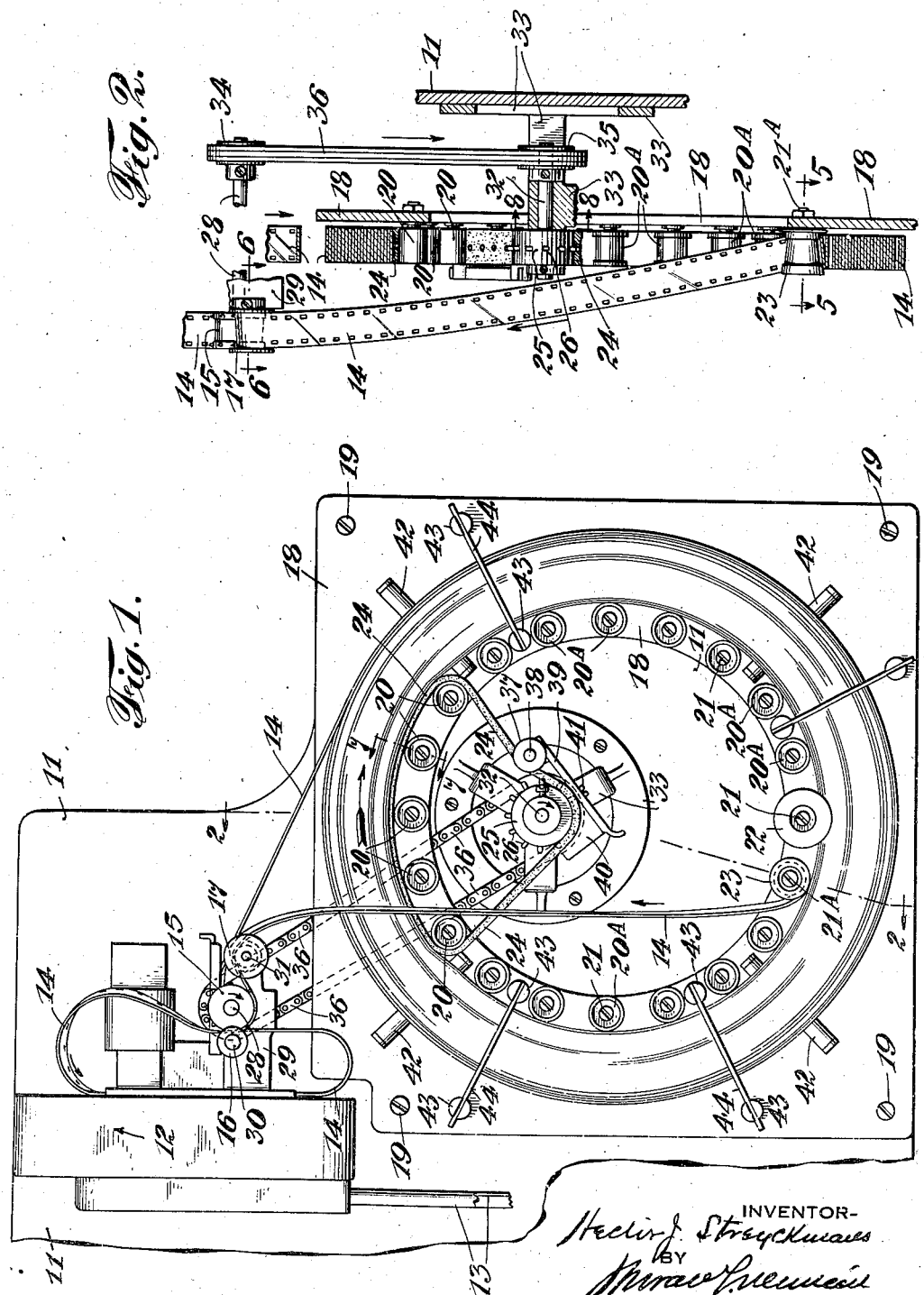

INVENTOR-
Hector J. Streyckmans
BY
ATTORNEY-

Patented Feb. 18, 1936

2,031,079

UNITED STATES PATENT OFFICE 2,031,079

DEVICE FOR THE REWINDING OF PHOTOGRAPHIC FILMS

Hector J. Streyckmans, New York, N. Y., assignor, by mesne assignments, to Automotion Pictures, Inc. of New York, New York, N. Y., a corporation of New York Application March 6, 1933, Serial No. 659,796

10 Claims. (Cl. 88—18.7)

My invention relates to automatic motion picture projectors, and refers particularly to rewinding and feeding the continuous film in such a projector.

In devices of this kind, the supply of endless film is in the form of an annulus which is supported and rotatably carried on an annular stationary reel. The film is fed to the projector head from the inside of the film annulus, which is thereby caused to rotate, and such rotation rewinds the used film, coming from the projector head, upon the outside of this continuously rotating annulus of film.

Since, in such an annular coil of film, the circumferential length of the outer coils is greater than the circumferential length of the inner coils, it is obvious that all of the coils must continuously slip relatively to one another, circumferentially of the rotating annulus of film and longitudinally of the film itself. The pull of the rotating film annulus upon the film as it is rewound continuously contracts the larger outer coils upon the smaller inner coils. This sliding of the film coils upon one another results in considerable frictional resistance, since the coils of film must constantly become adjusted, growing smaller and smaller as they pass inward. Should the film become slightly damp, from either humidity or oil, as it sometimes does, the frictional resistance is increased.

This feeding and concomitant rewinding operation is accomplished, in the device of my invention, by means of an endless traveling belt having an arcuate portion or run passing over a sufficient number of idler rollers, so as to have a gripping friction drive applied thereby to the inner face of the innermost coil of film. This belt may thus pass over the peripherally outer sides of a chosen number of such idler rollers, in the upper portion of the ring thereof, such as may be effective for the purpose. At the ends of such arcuate series of idler rollers, this belt passes to the inside of the ring of idlers and then around a driving pulley therefor. This drive pulley may have frictional driving engagement with the belt, which has proved to be effective under usual conditions, but such driving engagement is desirably of a positive nature. This is conveniently accomplished by means of a driving sprocket wheel having a smooth periphery provided with teeth in the form of rounded driving studs which pass through perforations in the belt. Such a belt may be of any suitable material which will not stretch too readily and which will provide a good friction grip upon the film, and pigskin has been found to be such a material.

The device of my invention includes features of construction and combination of parts, by means of which new and improved results are produced, as will appear from the following description, reference being had to the accompanying drawings, in which similar parts are designated by similar numerals and in which:

Figure 1 is a side elevation of one embodiment of my invention in a continuous automatic projecting machine.

Figure 2 is a section on the line 2—2 of Figure 1.

Figure 3:
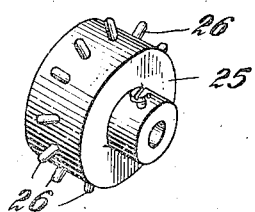
Figure 3 is an enlarged perspective view of a driving sprocket for a film-feeding belt, as appears in Figure 1.
Figure 4:
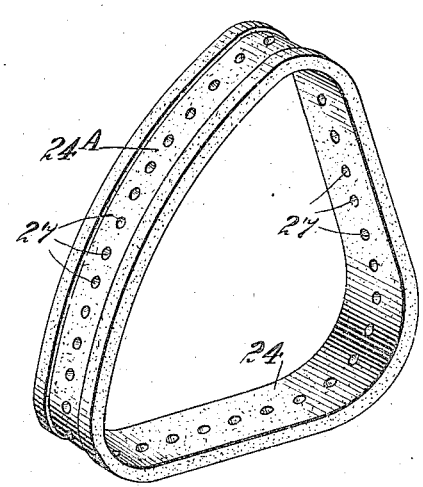
Figure 4 is an enlarged perspective view of the film-feeding belt which is driven by the sprocket wheel shown in Figure 3.

The projecting machine may be, and such machine in part shown in the accompanying drawings is, of a usual construction, with the exception of such changes in the construction of the rewinding mechanism thereof as are incident to the embodiment of my invention therein. In the projector illustrated in the drawings, various parts of the mechanism are mounted upon a main frame plate 11. Among these is a projector head 12. The mechanism of this projector head is indicated as being driven in the usual manner by means of a belt 13 which may proceed, as is usual, from an electric motor (not shown). The mechanism contained in the projector head 12 feeds the film 14 downward, in the usual intermittent manner. This film 14 is continuous or endless, that is, the opposite ends of such film have been spliced together.

The film 14 is immediately or adjacently fed or supplied to the projector head 12 by a sprocket wheel 15, and the used film coming from the projector head is taken up by means of a similar sprocket wheel (not shown). This latter or take-off sprocket is in line with the film as it comes from the projector head, while the supply sprocket 15 is out of such alignment, towards the front as viewed in Figure 1 and to the left as seen in Figure 2. These two sprockets are in axial alignment, coupled together and are continuously positively driven, in a usual manner in a clockwise direction as viewed in Figure 1, by means of the usual, or any suitable connections (not shown) to the mechanism contained in the projector head 12. The film 14 as it travels towards the projector head 12 passes beneath the supply sprocket 15 and the used film returns over the top of the above noted take-off sprocket. The upwardly turning film is retained on the supply sprocket 15 by a flanged idler roller 16, and a similar film-retaining idler (not shown) as provided for the above mentioned take-off sprocket, as is usual.

Figure 6:
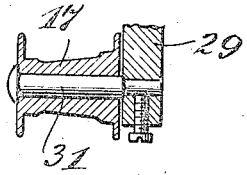
Figure 6 is a similar section on the line 6—6 of Figure 2.

The supply of film 14 as it moves toward the projector head 12 is guided to the feeding or supply sprocket 15 by means of a widely flanged idling guide roller 17. In view of the fact that the film 14 rises to this guide roller 17 at an edgewise angle, as indicated in Figure 1 and as clearly shown in Figure 2, in carrying out my invention this guide roller 17 is made of a cone shape, with its smaller end outward or at the front in Figure 1 and at the left in Figures 2 and 6. In other respects this part of the projector mechanism just described is shown as of a usual construction. Between this mechanism and the upper and lower ends of the projector head 12 there are the usual upper and lower slack loops in the film 14, of which the upper loop twists edgewise into alignment with the projector head intake. The sprocket 15 for the ingoing film to be used and its above noted companion sprocket for the outgoing or used film, may be considered as film-controlling sprockets for the projector head 12.

Figure 7:
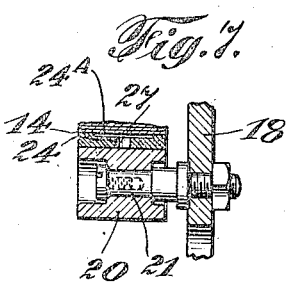
Figure 7 is a partial radial section on the line 7—7 of Figure 1.

A secondary frame plate 18 is carried by the main frame plate 11 in spaced relation thereto and is mounted thereon, in a usual manner, by means of spaces (not shown) and screws 19, 19. This frame plate 18, on its outer face, carries the reel for the coiled annulus of continuous film 14 and is provided centrally with a large circular hole, as shown in Figures 1 and 2. The reel itself is formed by means of a circular series or ring of loosely journaled spools or idler rollers shown as twenty in number, in all, mounted upon the outer face of the secondary frame plate 18 immediately surrounding its large circular hole. These idler rollers are shown as equidistantly circumferentially spaced, or substantially so. Of the twenty idler rollers or spools shown, five of them, 20, 20, in a consecutive arcuate series, at the top, are alike and are desirably smooth straight cylindrical rollers of even diameter throughout their length, extending throughout the width of the film 14, as shown in Figures 2 and 7, for a purpose to be described later.

Thirteen other idler rollers 20A, 20A form two lateral consecutive arcuate series which extend downwardly respectively from the opposite ends of the series of top rollers 20, 20. These laterally disposed rollers 20A, 20A are desirably circumferentially grooved out to a reduced diameter between flange-like end portions thereof of larger diameter, as shown in the lower part of Figure 2, as has been commonly done with film-bearing rollers, so as thereby to engage only with the margins of the film 14 and thus not come into contact with the picture-bearing body portion of the film. All of the idler rollers 20, 20 and 20A, 20A are loosely journaled on studs 21, 21 projecting from the frame plate 18, as shown in Figures 1, 2 and 7. The lowermost idler roller 22, shown in Figure 1, is similar to the rollers, 20A, 20A but has wide flanges at its ends so as to serve as a guide for the outgoing portion of the continuous film 14 at this point, and is loosely journaled on one of the studs 21, 21.

Figure 5:
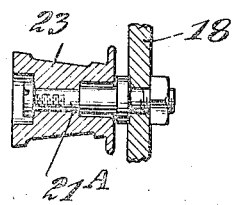
Figure 5 is an enlarged horizontal section on the line 5—5 of Figure 2.

The final idler roller 23, adjacent to the guide roller 22 in the circular series or ring of idler rollers, is of cone shape, with its larger end directed outward, or towards the front as viewed in Figure 1 and to the left as seen in Figures 2 and 5, this roller having a reduced diameter intermediate of its length and being flanged at its inner or smaller end, and is journaled on a bearing stud 21A. The outgoing portion of the endless film 14 is guided to this last roller 23 by the flanged guide roller 22. The film 14 passes around the cone-shaped idler roller 23 to the inside of the ring of idlers. From this idler 23 the film passes upwardly, turning edgewise outwardly, or towards the left in Figure 2, the smaller inner end of the cone-shaped roller 23 providing for this turn in the carrying out of my invention. From this inwardly tapering cone-shaped delivery idler 23, which is substantially at the bottom of the ring of idlers, the film 14 rises rather loosely, that is, with some slackness, or at times with slight tension, to the oppositely cone-shaped flanged guide roller 17.

In carrying out my invention, not only are the sprocket holes in the margins of the film not used at all in the rewinding operation, but desirably the film is not in any other way pulled out at all. In accordance with my invention, the coiled annulus of continuous film 14 is caused to travel rotatively or revolve upon the above described reel, comprising the ring of idler rollers, by means of force applied frictionally to the inner face of the innermost coil of the coiled annulus of film. The direction of rotation of the annulus of film depends upon the relation of the reel to the projector head 12. As shown in Figure 1, rewinding and feeding movement of the film annulus is clockwise as indicated by the arrow at the top thereof. Thus the used film coming from the projector head 12 is peripherally wound on such annulus thereof adjacent to its top, while the film which is to be used is pushed out of such coiled annulus from the inside thereof adjacent its bottom, beneath and upwardly around the outwardly flaring cone-shaped idler roller 23.

In the device of my invention illustrated in the accompanying drawings, an endless traveling belt 24 is employed for frictionally driving the coiled annulus of continuous film 14. This belt 24 has a sufficiently long substantially arcuate length or run thereof interposed between the innermost coil of film 14 and a sufficient number of the idler rollers 20, 20. In the particular device of my invention shown in the drawings, this belt 24 passes around or over an upper arcuate series of five of such idlers 20, 20. Thus this belt 24 is in frictional driving engagement with the inner face of the innermost coil of the continuous film 14 throughout substantially an upper quadrant of the complete circle. This frictional driving portion of the belt 24 is desirably at the top, as shown, so that thus nearly all of the weight of the coil of film 14 is borne upon this frictional film-driving portion of the belt 24, which supports and carries the coil of film, with a corresponding augmentation of frictional gripping engagement of the belt with the film, while there is more looseness between the coils of the film at other points, particularly along the bottom portion of such coils, where there is desirably considerable slack, so that the successive coils there become more or less separated, or spaced from one another, as shown in Figures 1 and 2.

The coil-driving belt 24 passes to the inside of the ring of idler rollers 20, 20, (20A, 20A), 22, 23, around the terminal idlers 20, 20 of the above noted arcuate series of five thereof. Within this ring of idler rollers the belt 24 passes around a driving pulley 25 therefor. This driving pulley is shown as a sprocket wheel having a smooth cylindrical peripheral surface with a circumferential series of rounded studs 26, 26 projecting radially therefrom along the middle line thereof and forming sprocket teeth. These sprocket teeth 26 engage in perforations or holes 27, 27 through the belt 24, arranged in a continuous series along the center line of the belt, and equidistantly spaced, corresponding to the spacing of the sprocket teeth 26, 26. Thus in the construction shown, the traveling belt 24 is driven in a positive manner by the sprocket wheel 25.

This film-driving friction belt 24, as shown in the drawings, particularly in Figures 2 and 7, is of the full width of the film 14 and bears evenly and continuously throughout its width upon the longitudinally straight-surfaced cylindrical idler rollers 20, 20 and similarly upon the smooth cylindrical peripheral surface of the belt-driving sprocket wheel 25, and is shown as of considerable thickness. The outer side of this belt 24, which frictionally drives the film 14, is desirably provided with a continuous longitudinal rather wide groove or channel 24A between its marginal portions, which are of full thickness throughout. Thus this channel-shaped friction belt 24 engages only with the marginal portions of the film 14 and does not touch the intermediate picture-carrying portion of the film, thereby preventing the possibility of the portion of the film which carries the picture from being scratched or marred by this belt. The thicker margins of the belt 24 have a sufficiently extended surface of engagement with the film 14 for effectively moving it, with no liability of the film being torn.

The traveling belt 24, along its outer face, is driven, by the sprocket 25, at a slightly greater linear speed than the continuous film 14 is fed to the projector head 12 by means of the projector sprocket 15, and taken away by the above noted companion take-off sprocket. This usual intake sprocket 15 and the hereinbefore mentioned usual take-off sprocket (not shown) positively control the linear speed adjacent to the projector head 12, the sprocket 15 controlling the intake of film to be used, while its companion sprocket controls the outgo of the used film, these two usual film-controlling sprockets being alike and continuously rotated in unison and in synchronism with the rate of use of the film as it passes, by successive intermittent movements, through the projector head 12. As above noted, these controlling sprockets are commonly driven from the projector head mechanism, of which they virtually form a part or feature.

These two controlling sprockets, that is, the sprocket 15 and its mate, are fixed upon a rotatable shaft 28 which is continuously rotated by means of connections (not shown) with the mechanism of the projector head 12. These two controlling sprockets, including the sprocket 15, and the belt-driving sprocket 25 for the film 14 are positively connected together for rotation in the same direction, with the belt-driving sprocket 25, along its smooth cylindrical periphery, driven at the same peripheral speed as the peripheral speed of the above noted controlling sprockets. The thickness of the belt 24 causes its film-engaging frictional belt-driving surface to move at a slightly faster speed. With a thinner belt, it could be extended around a larger arcuate number of the idler rollers 20, 20, in order to have sufficient frictional driving force, together with the proper amount of slipping of the belt on the film 14.

The shaft 28 is journaled in bearings which are provided by a bracket 29 which is mounted upon the front of the projector head 12. This bracket also carries a stud 30 upon which the film retaining idler roller 16 for the sprocket 15 is mounted, and further fixedly carries a stud 31 upon which the widely flanged film-guiding outwardly tapering cone-shaped idler roller 17 is mounted. The driving sprocket 25 for the belt 24 is fixed upon the outer end of a rotatable shaft 32 which is journaled in and passes through the central hub of a spider 33 which is firmly secured to the main frame plate 11 of the projecting machine. This shaft 32 is connected to the projector head shaft 28 to be positively driven thereby, by means of a sprocket wheel 34 fixed upon the inner end of the shaft 28, a sprocket wheel 35 fixed upon the inner end of the shaft 32 and a sprocket chain 36 extending between and around these sprocket wheels 34 and 35, in the space between the main frame plate 11 and the secondary frame plate 18.

Figure 8:
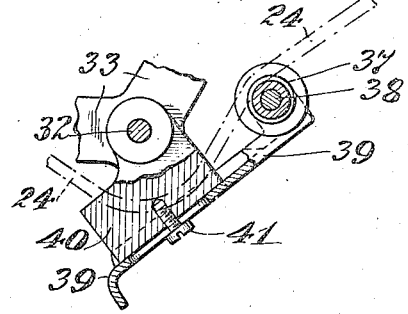
Figure 8 is a partial vertical section on the line 8—8 of Figure 2.
Figure 9:
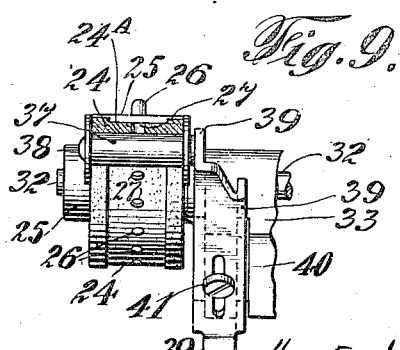
Figure 9 is a partial elevation as viewed from the right in Figure 8.

A flanged idler roller 37 guides the belt 24 to its driving sprocket 25. This guide roller 37 is adjustably mounted so as to serve also to maintain the belt 24 under the proper degree of tension or tightness. This roller 37 is journaled on a stud 38 fixedly carried by and projecting outwardly from one end of a slide arm 39, which inclines upwardly towards the right as viewed in Figures 1 and 8. This arm 39 is shown (in Figures 8 and 9) as of channel shape so as to be guided for longitudinal sliding movement along the face of a small bracket 40 forming an extension from the hub of the spider bracket 33. A screw 41 passing through a longitudinal slot in the slidable arm 39 secures the latter adjustably but firmly in place on the bracket extension 40.

The secondary frame plate 18 carries usual anti-friction rollers 42 for the inner edge of the film 14 in the annular coil or roll. This plate also is provided with usual outwardly projecting studs 43 which carry usual releasable or foldable clip bars 44, for preventing the accidental displacement of the coil of film 14 from the reel, the front edge of the coiled film being normally out of contact with these retaining bars, or latch bars.

In the operation of the device of my invention, the endless belt 24, by frictional engagement, moves the innermost coil of the continuous film 14 with a slight slippage thereon, relatively thereto. In practice, this slippage has been found to be intermittent or occasional and not constant or continuous. This innermost coil by reason of its frictional engagement with the next coil, moves the latter, and so on from coil to coil until the periphery of the annulus of coiled film is reached, there being a slight forward slippage of the inner coils within the outer coils, proceeding successively outwards radially.

It has been found in operation that the film winds tightly towards the center while there is slack towards the outer part of the coiled roll of film, particularly in the lower portion thereof. This slack relieves the rewinding tension on the film at the top. The winding tension on the film at the top advantageously comes upon the traveling belt 24. Whenever the amount of slack in the roll of film becomes abnormally great, then the belt slips on the film while such slack film is being used. Any tension on the portion of the film 14 which is traveling upwardly from the delivery idler 23 tightens the innermost coil of film against the upper film-engaging driving surface of the belt 24, thereby increasing the frictional film-driving force, which thus speeds up the traveling movement of the film and transfers slack from the coiled roll thereof to the upwardly moving delivered portion thereof above the delivery idler 23. The continuous film rewinding device of my invention has thus proved to be self-adjusting in its operation.

Otherwise stated, in the operation of the above described device of my invention, the feed tension or drawing pull of the intake feed mechanism of the motion picture machine upon the film 14 used thereby automatically controls the rate of speed at which the film is fed to the machine. In my device the drawing intake pull upon the film determines the amount of pressure of the face of the film upon the face of the continuously more rapidly moving friction surface of the feed belt 24 and thereby controls the amount of frictional driving force applied to the film 14.

The piece of film between the inner circle of my idlers and the projector head feed sprocket automatically controls the synchronism. As above noted, if this stretch of film starts to tighten it pulls the inner layer of film more tightly against the belt 24 which then automatically sends out more film. When this stretch of film becomes loose the pressure of the inner layer of film against the belt becomes less so that then correspondingly less film is pushed out by this belt.

The principle in accordance with which the device of my invention operates, together with the result produced, depends upon two things in combination. First, the faster speed of the feed belt 24, as compared with the speed of use of the film by the machine, determined by its intake sprocket 15, which rotates continuously. Second, the varying of the rate of speed at which the belt 24 feeds the film 14 out of the coil and towards the sprocket 15, by varying the amount of friction of the film 14 upon the faster moving belt 24, since varying this friction varies the speed at which the film is fed, to make such speed of the film either faster or slower than the speed at which the film is positively used by the machine.

Thus it will be seen, that there is not at all times at every moment, absolute synchronism between the rate of outgo of the film from the coil and the rate of its intake by the machine, but the average rate of such film leaving the coil does synchronize precisely with the rate of use of this film by the machine. The rate of speed at which the film 14 is fed by the belt 24 is thus variable and at any given moment is determined by the amount of tightness or looseness in the stretch of film which is passing to the continuously rotating feed sprocket 15, which latter supplies the film through a loop in the usual way to the intermittently acting framing feed, and thus performs a double function. The length of film contained in the coil is at times longer and at times shorter than at other times, but the peripheral tension functions at all times to rewind the film evenly.

The improved device of my invention renders possible and easy the successful rewinding of continuous film for commercial projecting machines using 1,000 feet, or more, of film, thus to render such machines continuous and automatic in operation. My invention is also advantageously applicable to amateur and professional projectors, using films of shorter length and commonly of smaller size as to width.

It is obvious that various modifications may be made in the construction of the device shown in the drawings and above particularly described, within the principle and scope of my invention as defined in the appended claims.

I do not limit myself to specific details in carrying out my invention, nor specifically to size, shape, proportions, or arrangement of parts, these being given simply as a means for clearly describing the device of my invention.

What I claim is:—

1. In a device for rewinding continuous motion picture film upon the top of the periphery of a substantially annular coiled roll thereof from the inside of which such film is returned to the projector head in an automatic projecting machine, in combination, an annular stationary reel for the coiled film including an upper arcuate series of idler rollers, an endless traveling belt passing along the upper sides of said series of idler rollers in frictional driving engagement with the inner face of the innermost coil of said film and passing around the terminal rollers in said series to the inside of said reel, said belt being provided throughout its length with a longitudinal series of perforations, a driving sprocket around which said belt passes within said reel, means for rotating said sprocket at a speed which will move the film-engaging surface of said traveling belt at a speed slightly faster than the positively determined speed at which said film is used by said projector head, and a film-feeding sprocket adapted to draw the film continuously away from said belt as it is fed thereby and toward said machine at the same rate of speed that the film is used by the machine and thus being adapted to control the amount of pressure of the film upon said belt and the consequent friction of the latter on the film and thus causing said belt to feed the film at a faster rate when the latter is tightened by said film-feeding sprocket and at a slower rate when such film becomes loose so that thereby the positive drawing pull of this latter sprocket upon the film will automatically control and vary the rate of speed at which the film is fed thereto by said faster traveling belt.

2. In a device for rewinding continuous motion picture film upon the top of the periphery of a substantially annular coiled roll thereof from the inside of which such film is returned to the projector head in an automatic projecting machine, in combination, an annular stationary reel for the coiled film comprising a circular series of idler rollers, an endless friction drive belt for revolving the coiled film on the reel passing over a chosen arcuate number of said idler rollers at the top of the circular series thereof in frictional driving engagement with the inner face of the innermost coil of said film and passing around the terminal rollers in said upper arcuate number thereof to the inside of said reel, and a driving pulley for said belt around which it passes within said reel, one of said idler rollers in the bottom portion of said circular series thereof being an outwardly flaring cone-shaped roller so as thereby effectively to serve as a film-delivering roller around which the innermost coil of said film passes inwardly and upwardly at the outside of said coiled roll thereof in the upwardly returning movement of this portion of said continuous film to said projector head.

3. In a device for rewinding continuous motion picture film upon the top of the periphery of a substantially annular coiled roll thereof from the inside of which such film is returned to the projector head in an automatic projecting machine, in combination, an annular stationary reel for the coiled film comprising a circular series of idler rollers, an endless friction drive belt for revolving the coiled film on the reel passing over a chosen arcuate number of said idler rollers at the top of the circular series thereof in frictional driving engagement with the inner face of the innermost coil of said film and passing around the terminal rollers in said upper arcuate number thereof to the inside of said reel, said belt being provided throughout its length with a longitudinal series of perforations, a driving sprocket around which said belt passes within said reel, driving connections for positively rotating said sprocket from the projector head mechanism at a speed which will move the film-engaging surface of said traveling belt at a speed slightly faster than the positively determined speed at which said film is used by said projector head, one of said idler rollers adjacent the bottom of said reel being an outwardly flaring cone-shaped roller to serve as a film-delivering roller around which the innermost coil of said returning film is pushed out inwardly and upwardly by said belt, to be returned upwardly at the outside of said reel to said projector head, and an outwardly tapering cone-shaped idler roller adjacent to said projector head for guiding such upwardly returning film portion to said projector head.

4. In a device for rewinding continuous motion picture film upon the top of the periphery of a substantially annular coiled roll thereof from the inside of which such film is returned to the projector head in an automatic projecting machine, in combination, an annular stationary reel for the coiled film comprising a circular series of idler rollers, an endless friction drive belt for revolving the coiled film on the reel passing over a chosen arcuate number of said idler rollers at the top of the circular series thereof in frictional driving engagement with the inner face of the innermost coil of said film and passing around the terminal rollers in said upper arcuate number thereof to the inside of said reel, said belt being provided throughout its length with a longitudinal series of perforations, a driving sprocket around which said belt passes within said reel, driving connections for positively rotating said sprocket from the projector head mechanism at a speed which will move the film-engaging surface of said traveling belt at a speed slightly faster than the positively determined speed at which said film is used by said projector head, said belt being of channel shape throughout its length along its film-engaging side so as to have frictional driving engagement only with the marginal portions of the film to the exclusion of the intermediate body portion of the film, one of the said idler rollers adjacent the bottom of said reel being an outwardly flaring cone-shaped roller to serve as a film-delivering roller around which the innermost coil of said returning film is pushed out inwardly and upwardly by said belt to be returned upwardly at the outside of said reel to said projector head, and an outwardly tapering cone-shaped idler roller adjacent to said projector head for guiding such upwardly returning film portion to said projector head.

5. In a device for rewinding continuous motion picture film upon the periphery of a substantially annular coiled roll thereof from the inner side of which such film is returned to the projector head in an automatic projecting machine, in combination, a pair of similar axially aligned film-controlling sprockets adjacent the front of said projector head coupled together and positively continuously driven in unison from the projector head mechanism at a peripheral speed in synchronism with the rate of speed at which the film is used by the projector head mechanism, one of said sprockets being a take-off sprocket for the used film in line with and in engagement with such film as it comes from the projector head and also in alignment with said coiled roll of film, and the other of said sprockets being an intake sprocket for supplying film to the projector head and outwardly out of alignment with the projector head intake, an outwardly tapering cone-shaped idler roller for guiding ascending film from the inner side of the lower portion of said coiled roll of film to said intake sprocket, an annular stationary reel for the coiled roll of film comprising a circular series of idler rollers, an endless friction drive belt passing over a chosen upper arcuate number of said idler rollers at the top of said reel in frictional engagement with the inner face of the innermost coil of said film and passing downwardly and inwardly around the terminal rollers in said upper arcuate number thereof to the inside of said reel, a driving sprocket around which said belt passes within said reel, positively acting driving connections between said pair of film-controlling sprockets and said belt-driving sprocket for positively rotating the latter sprocket at a speed which will move the film-engaging surface of said traveling belt at a speed slightly faster than the linear speed at which the film is positively moved by said pair of film-controlling sprockets, and an outwardly flaring cone-shaped idler roller forming one of said circular series of idler rollers in the lower portion of said reel around which the innermost coil of said returning film is pushed out inwardly and upwardly by said belt to return upwardly at the outside of said reel to said outwardly tapering cone-shaped film-guiding idler roller.

6. In a device for rewinding continuous motion picture film upon the top of the periphery of a substantially annular coiled roll thereof from the inside of which such film is returned to the projector head in an automatic projecting machine, in combination, an annular stationary reel for the coiled film comprising a circular series of idler rollers, an endless friction drive belt for revolving the coiled film on the reel passing over a chosen arcuate number of said idler rollers at the top of the circular series thereof in frictional driving engagement with the inner face of the innermost coil of said film and passing around the terminal rollers in said upper arcuate number thereof to the inside of said reel, and a driving pulley for said belt around which it passes within said reel, said belt being of channel shape throughout its length along its film-engaging side so as to have frictional driving engagement only with the marginal portions of the film to the exclusion of the intermediate body portion of the film, each of said upper arcuate number of idler rollers having a smooth straight cylindrical surface extending along its length throughout the width of said belt and the other idler rollers in said circular series thereof being of reduced diameter between end portions thereof of larger diameter so as to engage only with the marginal portions of the film to the exclusion of the intermediate body portion of the film.

7. In a device for rewinding continuous motion picture film upon the top of the periphery of a substantially annular coiled roll thereof from the inside of which such film is returned to the projector head in an automatic projecting machine, in combination, an annular stationary reel for the coiled film comprising a circular series of idler rollers, an endless friction drive belt for revolving the coiled film on the reel passing over a chosen arcuate number of said idler rollers at the top of the circular series thereof in frictional driving engagement with the inner face of the innermost coil of said film and passing around the terminal rollers in said upper arcuate number thereof to the inside of said reel, said belt being provided throughout its length with a longitudinal series of perforations, a driving sprocket around which said belt passes within said reel, and means for rotating said sprocket at a speed which will move the film-engaging surface of said traveling belt at a speed slightly faster than the positively determined speed at which said film is used by said projector head, said belt being of channel shape throughout its length along its film-engaging side so as to have frictional driving engagement only with the marginal portions of the film to the exclusion of the intermediate body portion of the film, each of said upper arcuate number of idler rollers having a smooth straight cylindrical surface extending along its length throughout the width of said belt and the other idler rollers in said circular series thereof being of reduced diameter between end portions thereof of larger diameter so as to engage only with the marginal portions of the film to the exclusion of the intermediate body portion of the film.

8. In a device for rewinding and feeding continuous film to a motion picture machine from within a coiled annulus thereof upon the periphery of which the used film is rewound, in combination, guiding means adapted to guide said film annulus for revolving movement of the latter, an endless friction feed belt having a film-feeding friction surface in frictional engagement with the inner face of the innermost coil of film in said annulus adapted to impart a linear feed movement to the film and revolution to the annulus thereof, guiding means for said belt, driving means for said belt adapted to move its film-feeding friction surface at a faster rate of speed than the film is used by said machine, and positively acting feed means adapted to draw the film continuously away from the friction surface of said belt and toward said machine at the same rate of speed that the film is used by said machine, so that thereby the drawing pull of said feed means upon the film automatically controls the rate of speed at which the film is fed to said feed means from within said film annulus by said friction feed belt and causes the latter to feed the film at a faster rate when the latter is tightened by said feed means and at a slower rate when such film becomes loosened.

9. In a device for rewinding and feeding continuous film to a motion picture machine from within a coiled annulus thereof upon the periphery of which the used film is rewound, in combination, guiding means adapted to guide said film annulus for revolving movement of the latter, an endless friction feed belt having a film-feeding friction surface in frictional engagement with a segmental portion only of the inner face of the innermost coil of film in said annulus adapted to impart a linear feed movement to the film and revolution to the annulus thereof, guiding means for said belt, driving means for said belt adapted to move its film-feeding friction surface at a faster rate of speed than the film is used by said machine, and positively acting feed means adapted to draw the film continuously away from the friction surface of said belt and toward said machine at the same rate of speed that the film is used by said machine, so that thereby the drawing pull of said feed means upon the film automatically controls the rate of speed at which the film is fed to said feed means from within said film annulus by said friction feed belt and causes the latter to feed the film at a faster rate when the latter is tightened by said feed means and at a slower rate when such film becomes loosened.

10. In a device for rewinding and feeding continuous film to a motion picture machine from within a coiled annulus thereof upon the periphery of which the used film is rewound, in combination, guiding means adapted to guide said film annulus for revolving movement of the latter about a horizontal axis, an endless friction feed belt having a film-feeding friction surface in frictional engagement with an upper segmental portion only of the inner face of the innermost coil of film in said annulus adapted to impart a linear feed movement to the film and revolution to the annulus thereof, means adapted to direct the used film to the top of the periphery of said revoluble film annulus, guiding means for said belt, driving means for said belt adapted to move its film-feeding friction surface at a faster rate of speed than the film is used by said machine, and positively acting feed means adapted to draw the film continuously away from the friction surface of said belt and toward said machine at the same rate of speed that the film is used by said machine, so that thereby the drawing pull of said feed means upon the film automatically controls the rate of speed at which the film is fed to said feed means from within the upper portion of said film annulus by said friction feed belt and causes the latter to feed the film at a faster rate when the latter is tightened by said feed means and at a slower rate when such film becomes loosened.

HECTOR J. STREYCKMANS.